Figure 5:
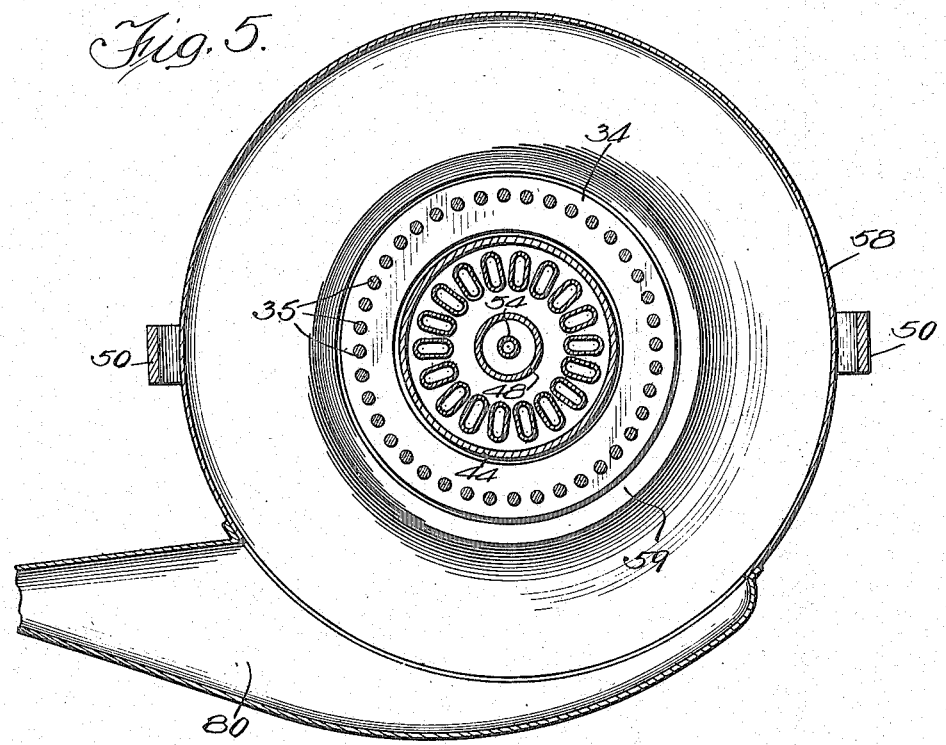
Figure 4:
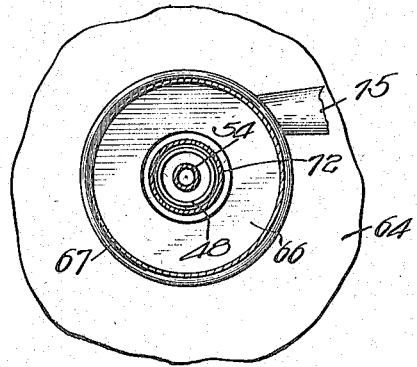

Aug. 5, 1924.
W. J. DAVIS
METHOD OF PASTEURIZING MILK, ETC
Filed Oct. 2, 1922   5 Sheets-Sheet 1
1,504,197
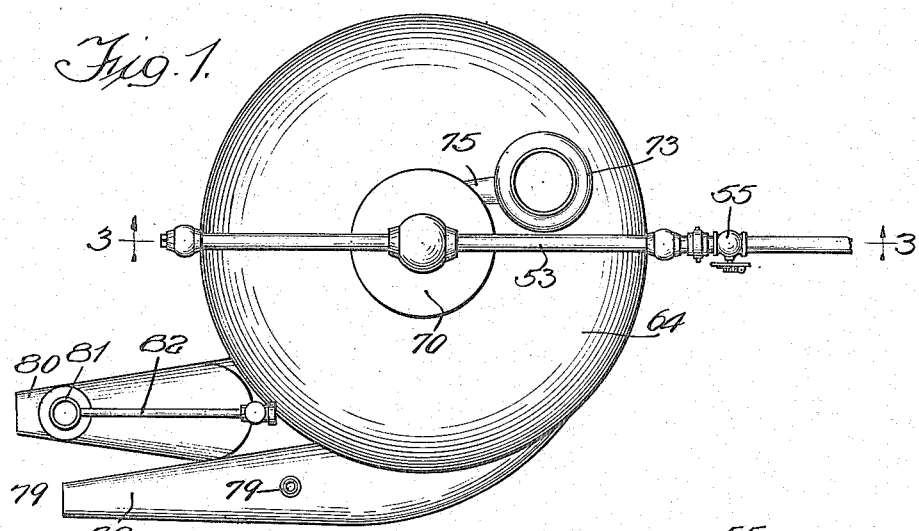
Fig. 1.
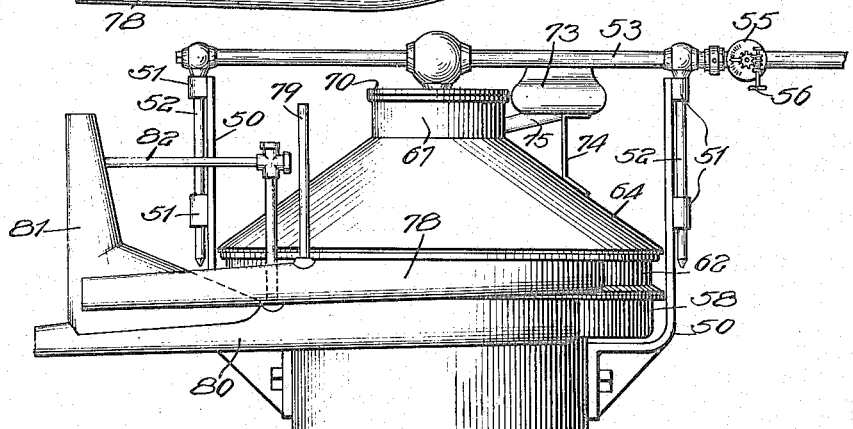
Fig. 2.
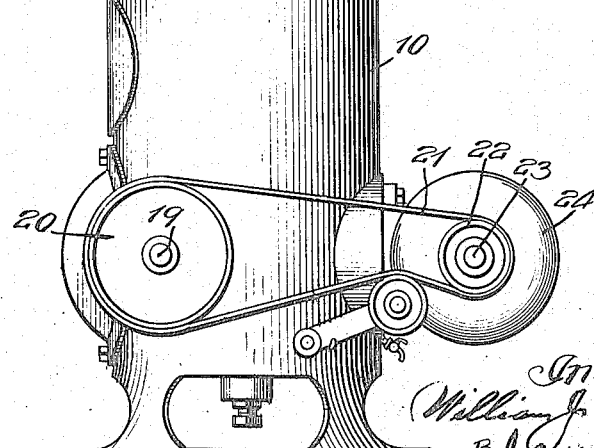
Witnesses:
W. F. Kilroy
Harry R. White
Inventor:
William J. Davis
By John Howard Mellen
His Atty

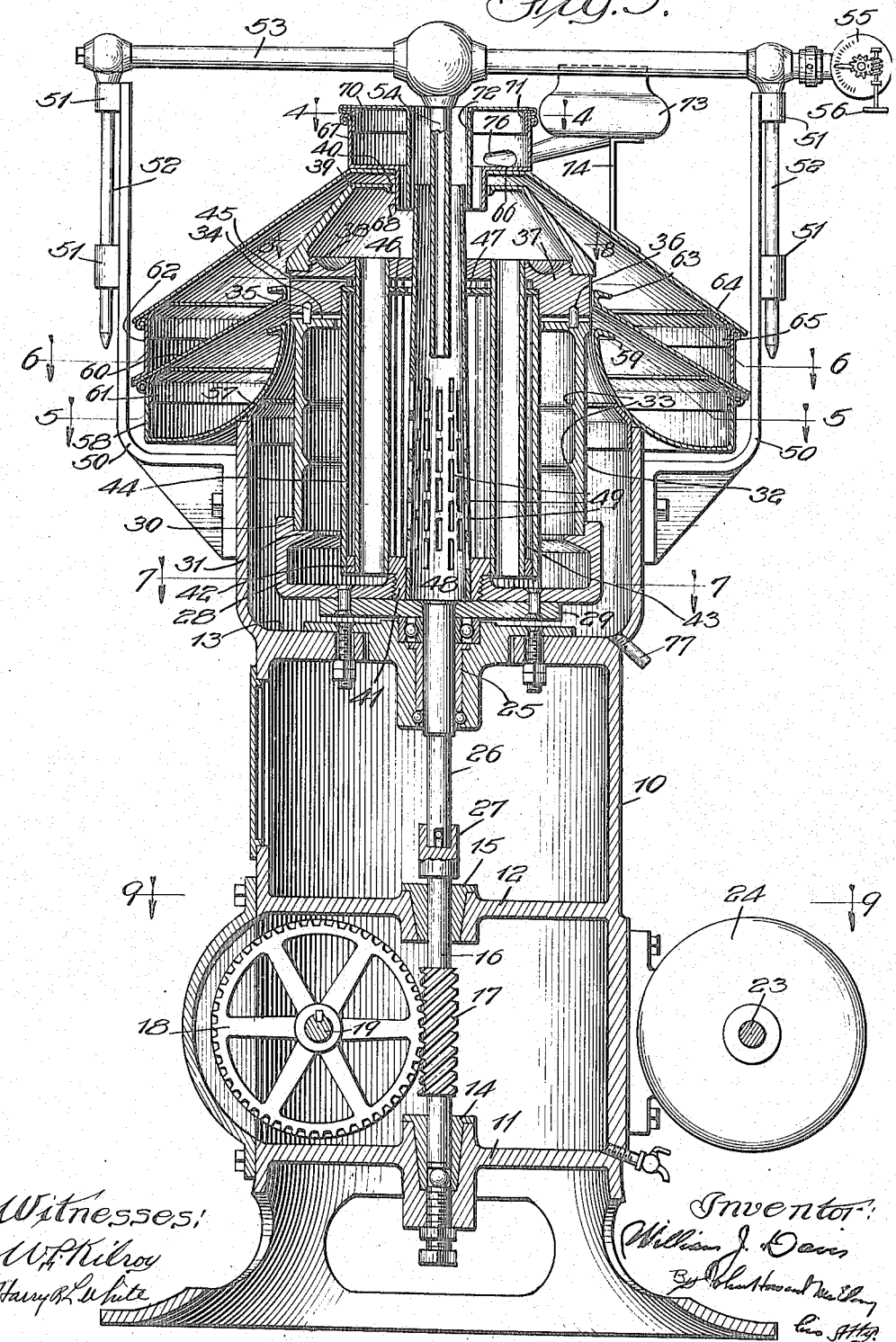

Aug. 5, 1924.

W. J. DAVIS

METHOD OF PASTEURIZING MILK, ETC

Filed Oct. 2, 1922     5 Sheets-Sheet 3

1,504,197

Witnesses:
W. F. Kilroy
Harry H. L. White

Inventor:
William J. Davis
By John Howard McElroy
his Atty.

Aug. 5, 1924.

W. J. DAVIS

METHOD OF PASTEURIZING MILK, ETC.

Filed Oct. 2, 1922   5 Sheets-Sheet 4

1,504,197

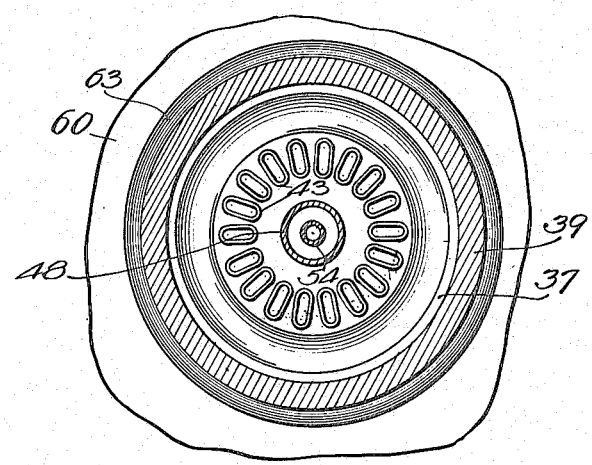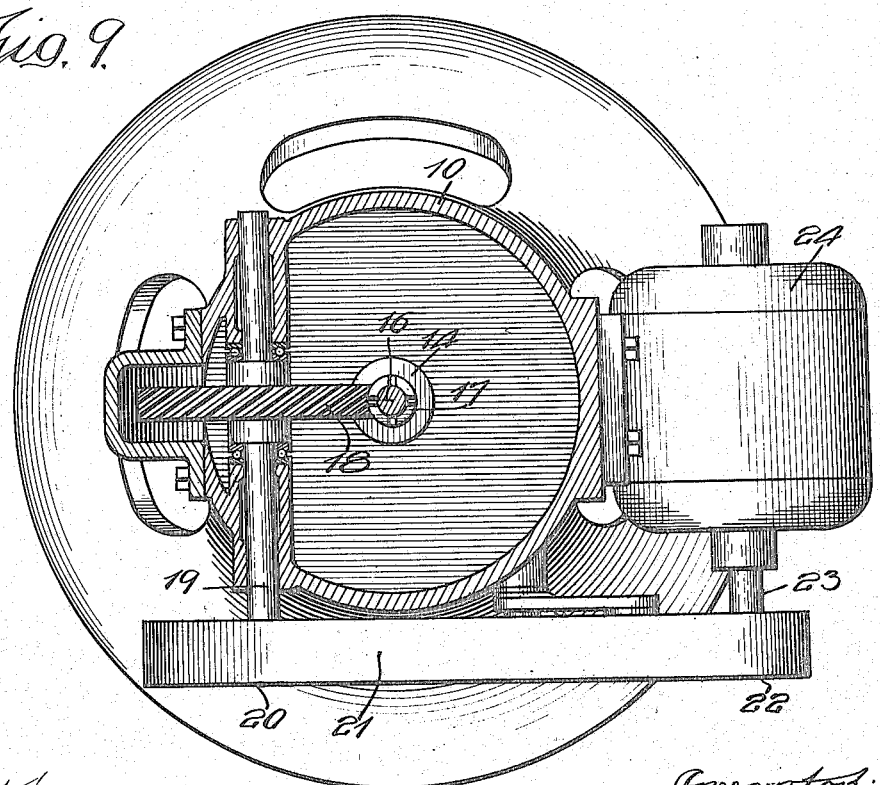

Patented Aug. 5, 1924.

1,504,197

UNITED STATES PATENT OFFICE.

WILLIAM J. DAVIS, OF CHICAGO, ILLINOIS; GLADSTONE B. DAVIS ADMINISTRATOR OF THE SAID WILLIAM J. DAVIS, DECEASED.

METHOD OF PASTEURIZING MILK, ETC.

Application filed October 2, 1922. Serial No. 591,758.

*To all whom it may concern:*

Be it known that I, WILLIAM J. DAVIS, a citizen of the United States, and a resident of Chicago, in the county of Cook and State of Illinois, have invented certain new and useful Improvements in Methods of Pasteurizing Milk, Etc., of which the following is a specification.

My invention is concerned with a novel method of pasteurization by which I am enabled quickly to pasteurize liquids, such as milk, without destroying the cream line or affecting its taste.

It has been known that milk may be pasteurized so as to destroy all germs quickly by submitting it to a high temperature, such as 180° Fahrenheit. This, however, is open to the objection that the taste of the milk is affected, as if by partial cooking, and that where whole milk is pasteurized, the heat affects the fat globules in some manner so that, instead of cream rising, a layer of butter fat collects on the top of the milk.

It has also been known that milk may be pasteurized thoroughly without either affecting its taste or destroying the cream line, by raising it to a certain temperature, 140° Fahrenheit, and holding it at that temperature for thirty minutes, the lower temperature for the thirty minutes being as efficient for destroying the bacteria as the higher temperature of 180° for the shorter period. While this last mentioned method is practicable, it requires a large expenditure of thermal units in steam or hot water.

By my invention, I bring the milk up to a higher pasteurizing temperature than has heretofore been thought possible without affecting either the taste or the cream line, and that with a substantially less expenditure of thermal units than has heretofore been necessary.

In carrying out my invention, I employ some form of centrifugal apparatus, and in order to illustrate the preferred form of said apparatus, I annex hereto five sheets of drawings, in which the same reference characters are used to designate identical parts in all the figures, of which,—

Fig. 1 is a top plan view of the apparatus;
Fig. 2 is a side elevation of the same;
Fig. 3 is a central vertical section on the line 3—3 of Fig. 1; and
Figs. 4, 5, 6, 7, 8 and 9 are plan views in section on the lines 4—4, 5—5, 6—6, 7—7, 8—8 and 9—9, respectively, of Fig. 3.

The centrifugal apparatus preferably has the base 10 in the form of a hollow cast cylinder having the horizontal partitions 11, 12 and 13, with bearings 14 and 15 in the partitions 11 and 12 for the spiral gear shaft 16 journaled therein, and which has the spiral gear 17 secured thereon meshing with the spiral gear wheel 18 secured on the shaft 19 journaled in suitable bearings in the cylinder, and having on the outer end thereof the belt wheel 20 by which it is driven through the belt 21 from the belt pulley 22 secured on the armature shaft 23 of the motor 24. Of course it will be understood that it might be driven by other power, but an electric motor furnishes a simple driving apparatus for securing the required high speed of from four to five thousand revolutions per minute of the shaft 16.

Figure 6:
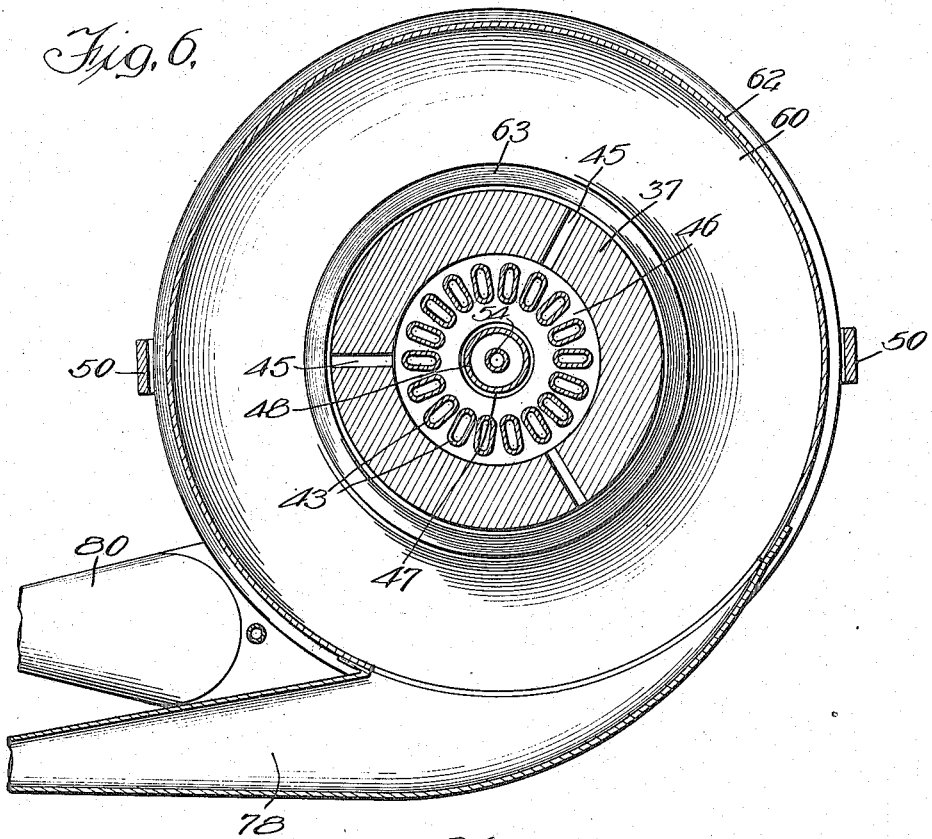
Figure 7:
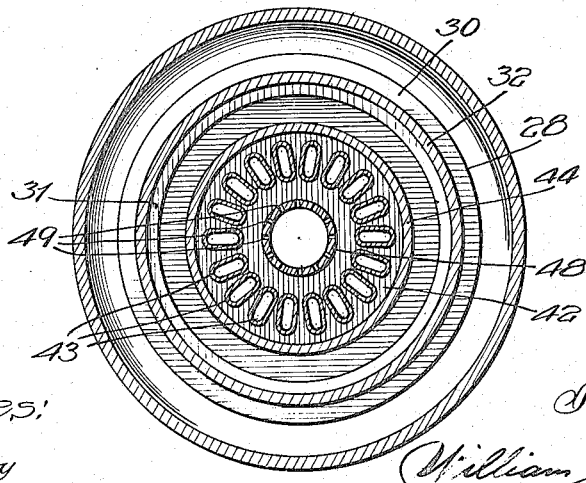

Journaled in the bearing 25, preferably a ball bearing, is the shaft 26, the ower end of which is seated in and splined to the cup 27 forming the top of the shaft 16, so that the bowl 28 secured on the top of the shaft 26 will be rotated at the same speed as the shaft 17. This bowl preferably consists of the circular plate 29 in which the top of the shaft 26 is secured, and to which is riveted the shallow bowl section 30 having the inwardly projecting annular flange 31, on which is seated the bowl portion proper 32, which is preferably of somewhat lesser diameter, and may be provided with the internally extending annular ribs 33. At the top of the cylindrical portion 32 is formed an inwardly extending annular flange 34 in which are secured the plurality of upwardly extending short pins or studs 35 (see Fig. 5), which studs or pins have their upper ends rounded, as shown, to co-operate with the annular groove 36 formed in the under surface of the head 37 of the bowl. This head has on its upper surface the reduced externally threaded portion 38 upon which is screwed the cap portion 39 having the general shape of a truncated cone with a circular opening 40 in its top. Screwed into the bottom of the portion 28 is the hub 41 of a disk 42, which disk 42 has secured therein the plurality of vertically extending tubes 43, arranged in a circle and extending up through the head 37 and opening beneath the cap 39. Surrounding and secured to the periphery of the disk 42 is the sleeve 44, the upper end of which fits into the under surface of the head 37, making a liquid-tight cylinder surrounding the tubes 43. Cut through the head 37, as best seen in Fig. 6, are three or more radially extending channels 45, which furnish an outlet for the water, as hereinafter described. The sleeve 44 has its upper end partly closed, as it were, by the annular disk 46 secured between it and the head 37, and having apertures through which the tubes 43 pass with a liquid-tight joint, and having the larger central aperture 47 which furnishes an outlet for the water to the passages 45. I preferably secure in the center of the disk 42 a tube 48, which preferably tapers slightly as it extends upward, and which has the plurality of apertures 49 in the walls of the lower half thereof. All of the bowl mechanism thus far described, it will be noted, rotates with the shaft 26.

Above the horizontal partition 13, the shell or casing 10 is preferably slightly enlarged, although retaining its cylindrical form, and to the outside of the casing I bolt the pair of arms or brackets 50, which extend up above the level of the bowl and have on the outer sides thereof the pair of apertured lugs or ears 51, in which are placed the positioning rods 52 secured to and extending vertically downward from the pipe 53 extending transversely above the apparatus, and having the discharge pipe 54 extending downwardly from the center thereof into the center of the tube 48. This pipe 53, which conveys the steam to the apparatus, has the valve 55 therein, which I find it advisable to provide with a fine-adjustment operating handle 56 so that the extent to which the valve can be opened can be regulated to a nicety. Seated in the top of the shell 10 and positioned by the annular sheet-metal flange 57 extending downward from the under side thereof is the annular basin 58 to receive the milk, and this basin consists of the vertical annular outer wall and the curved annular inner wall, which inner wall terminates with the overhanging annular flange 59. The top of this annular basin is closed by a sheet-metal annular cover 60, which is positioned by the annular flange 61 projecting downward from the bottom thereof, and this cover 60 has the vertical annular wall 62, so that this cover becomes in effect a basin for the water of condensation thrown off during the operation of the apparatus. The inner edge of the cover 60 is provided with an overhanging annular flange 63 similar to the flange 59, and this upper basin is in turn closed by the cover 64, which is seated in the combined cover and basin member 61 by the downwardly projecting annular flange 65.

This cover 64 is the shape of a truncated cone, and has the flat cup portion upon which is seated or secured the base 66 of the cup 67, which has the reduced downwardly extending sleeve portion 68, the outer wall of which is spaced a little distance away from the edge of the opening 40 in the cover 39. The cup 67 is in turn preferably closed by the cover 70, which has the downwardly extending annular flange 71 at its periphery fitting into the top of the cup 67, and it is provided with a downwardly extending sleeve 72 at its center, which sleeve 72 is concentric with and spaced inwardly some distance from the sleeve 68. A small receiving bowl or cup 73 is preferably supported a little distance from the center of the apparatus by the bracket 74 secured on the top of the cover 64, and is preferably connected therewith by the discharge spout 75 leading from the bottom thereof and opening tangentially at 76 into the side of the cup 67. Suitable valve regulating mechanism of any desired character may be employed in connection with the cup 73 to regulate the speed at which the milk is delivered to the apparatus. For drainage purposes, a small pipe 77 is let into the bottom of the cup formed by the upper portion of the shell 10 and the partition 13.

The operation of the pasteurization is as follows: The bowl is driven by the motor and gearing shown at the desired rate of speed, from four to five thousand revolutions per minute, and the valve 55 is opened to admit some steam, which rushes down through the pipe 54 and is discharged into the tube 48 and passes through the apertures 49 thereof into the steam cup bounded by the sleeve 44, where it will condense and pile up until it surrounds the tubes 43, and extends inwardly to the opening formed in the center of the annulus 46, after which the extra water of condensation flows out through the passages 45 into the combined cover and basin 60, whence it is discharged by the tangential pipe 78 (see Figs. 1, 2 and 6), and the outer end of this spout 78 will be connected with a pipe leading the water of condensation to wherever it may be desired to use or waste the same. A tube 79 placed in the top of the spout 78 permits any vapor which may accompany the water of condensation to be discharged before it enters the pipe connected to the spout.

When the bowl has thus been supplied with the condensed steam so that the water of condensation begins to flow off, the milk is discharged at the desired rate into the bowl 73, whence it discharges tangentially through the aperture 76 into the cup 67, whence it flows down in the annular space between the sleeves 68 and 72, where it is thrown outward on striking the rotating head 47, until the same is filled to the plane of the tubes 43, when it will flow downward through the tubes 43 and fill the bowl until the milk reaches the inner edge of the flange 34, whence it will be thrown out through the annular passage formed between the flange 35 and the head 37, and be discharged into the lower basin 58 and flow out through the tangential discharge spout 80 (see Figs. 1, 2 and 5), and the outer end of the spout 80 will be connected with a pipe leading the pasteurized milk to wherever it is desired to deliver the same. I have found by operation of the apparatus that it is necessary to provide a good sized vent pipe 81 opening into the top of the spout 80, to permit the escape of the vapor arising from the milk. This vent pipe 81 may also be connected by the pipes 82 toward its upper end with the spout 80, as seen in Fig. 2. When the milk has been running long enough to fill the apparatus, it will be apparent that it will flow rapidly down through the pipes 43, and back up on the outer part of the bowl, and discharge in the manner described, and the degree to which it is heated can be regulated to a nicety by the amount to which the valve 55 is opened, it of course being assumed that the steam is maintained at a constant temperature during the operation of the apparatus.

The milk can be heated to any temperature desired between 145° and 175° Fahrenheit depending upon the desires of the user. If he desires subsequently to hold the milk for thirty minutes by the method now generally practiced, 145° will be sufficient, but if he desires to complete the pasteurization by the centrifugal heating only, a much higher temperature is desirable to insure all of the bacteria being killed in the brief interval of time it remains at the high temperature.

While I have determined experimentally that the milk so pasteurized can reach a temperature of 175° Fahrenheit in the apparatus without either affecting its taste or destroying the cream line, I am unable to state the reason of it unless it be as follows: The milk passes through the rotating bowl down the tubes 43 and back up on the outer surface of the bowl while said bowl is rotating rapidly, at from four to five thousand revolutions per minute, with the result that the centrifugal action on the milk forces it closely in contact with the walls of the tubes 43, with which in turn the water of condensation is forced closely in contact by the centrifugal action, so that the heat exchange can occur very rapidly and completely and in such a short time that the taste of the milk and the fat globules are not affected. The hot water is held in intimate contact with the outer surface of the tubes, with the result that the heat is applied almost directly and very efficiently to the milk in the tubes, thus enabling the entire quantity of the milk passing through the tubes to be completely and equally permeated by the heat so that the bacteria will certainly be killed despite the very brief time that the milk is so permeated, which time is insufficient either to cook the milk so as to affect its taste or to destroy the cream line and thus affect its salability.

While I have described my invention as carried out in the manner at present best known to me, it will be understood that it may be capable of some modifications, and that I do not desire to be limited in the interpretation of the following claims except as may be necessitated by the state of the prior art.

What I claim as new, and desire to secure by Letters Patent of the United States, is:

1. The method of pasteurizing milk, etc., which consists in exposing the liquid for a brief interval to a pasteurizing heat in excess of 144° Fahrenheit while said liquid is being positively rotated and subjected to a strong centrifugal action.

2. The method of pasteurizing milk, etc., which consists in exposing the liquid for a brief interval to a pasteurizing heat in excess of 144° Fahrenheit while said liquid flows axially past the heating element, both the liquid and the heating element being positively rotated and subjected to a strong centrifugal action.

In witness whereof, I have hereunto set my hand this 8th day of September, 1922.

WILLIAM J. DAVIS.